Figure 1:
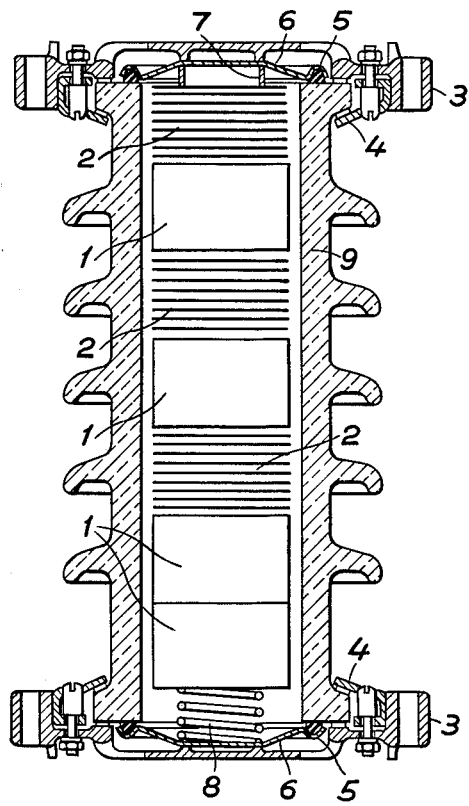

July 2, 1963

B. GRUNDMARK 3,096,461

LIGHTNING ARRESTER WITH RESILIENT SEALING LID

Filed Oct. 30, 1961

INVENTOR.
Bengt Grundmark

BY
Bailey, Stephens & Huettig
ATTORNEYS

United States Patent Office 3,096,461
Patented July 2, 1963

3,096,461
LIGHTNING ARRESTER WITH RESILIENT
SEALING LID
Bengt Grundmark, Ludvika, Sweden, assignor to Allmänna Svenska Elektriska Aktiebolaget, Vasteras, Sweden, a Swedish corporation
Filed Oct. 30, 1961, Ser. No. 148,662
Claims priority, application Sweden Nov. 19, 1960
3 Claims. (Cl. 315—36)

The present invention relates to a lightning arrester with a substantially cylindrical casing of insulating material.

Lightning arresters must be provided with sealing means such that their inner parts are well protected against the outer atmosphere. The sealing of a lightning arrester casing is generally carried out with the help of rubber gaskets between the insulating housing usually made of glass or porcelain, and the normally metallic end armatures, or separate sealing lids attached to said armatures. So that the seals will have a long life it is advantageous that the gasket is not rigidly compressed but rather rests under yielding compression so that the pressure is substantially maintained even if the gasket material sets or hardens with time for instance as a result of high ambient temperature. The temperature or the sealing lid which compresses the gasket shall also absorb the static force from the springs which compress the electrically active elements inside the arrester and thus must also be dimensioned for the dynamic forces which the said element may cause when the lightning arrester, for example, during transport, is subjected to mechanical shocks and vibrations in the longitudinal direction.

Moreover, a lightning arrester should be so arranged that its housing shall not burst in the event of a fault inside the arrester, when the consequent high short circuit current builds up a high pressure of gas inside, but shall have a pressure relief device which then comes into operation. Such a pressure relief device can be arranged in several different ways. It is known to make part of the sealing lid as a thin membrane which bursts when overpressure occurs. It is also known to fix the sealing lid with weak rivets or screws which are dimensioned to break on overload. Still another known design is to load the sealing lid by means of a conical plate spring, conventionally referred to as a Belleville spring, which yields and reverses permanently thus leaving an opening between the lid and the insulating housing.

In all the known arrangements with spring-loaded sealing members, however, the difficulty is present that the above mentioned forces from the inner parts counteract the sealing pressure so that this cannot be arbitrarily chosen solely with respect to the sealing. According to the present invention this disadvantage is removed since the sealing lid is in itself a spring plate, the central part of which rests rigidly against the end armature and the periphery of which exerts a resilient pressure on the gasket. The electrically active parts inside the arrester are arranged so that they are supported from the same rigid central part, and therefore the resilient sealing pressure is not influenced by any static or dynamic forces from the internal parts.

Thus the spring-force of the sealing lid does not need to be dimensioned with reference to the forces from the inner parts of the lightning arrester, but can be limited to that which is required to give a satisfactory sealing pressure. The sealing gasket can, on the other hand, be chosen of a softer and better sealing material, since the sealing lid and therewith the gasket according to the invention do not need to take up any extra pressure originating from the inner parts of the lightning arrester.

Figure 2:
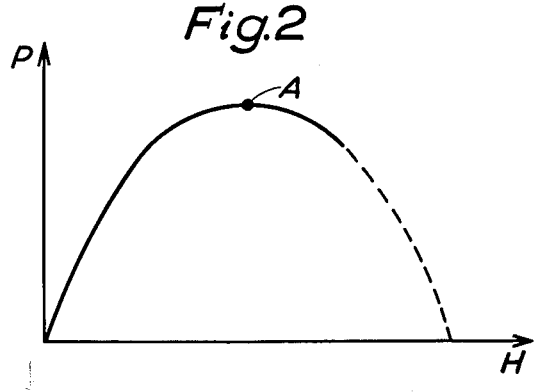

The invention will be described in the following with reference to the accompanying schematical drawing in which FIGURE 1 shows a lightning arrester provided with sealing lid according to the invention. FIGURE 2 shows a curve of the pressure force of the sealing lid as a function of its compression.

In FIGURE 1 is shown a lightning arrester or a section from a multi-section arrester comprising valve resistors 1 and spark gaps 2, which are enclosed in an insulating casing 9. The inner elements of the lightning arrester, consisting of the valve resistors 1 and spark gaps 2, are compressed by a pressure spring 8. The casing 9 is closed at both ends by metallic flanges 3 which are attached to the casing with resilient clamps 4. The arrester casing is sealed with gaskets 5 suitably of soft rubber, which is pressed against the insulating casing 9 by a metallic sealing lid 6. At its centre part the sealing lid 6 rests against the flange 3, and the inner elements of the arrester in this centre part abut against the end armatures via a spacer 7, the circumference of which is considerably smaller than the diameter of the gasket.

The sealing lid 6 is mounted so that the gasket 5 is suitably loaded by a pressure independent of the compressive forces of the pressure spring 8 since these compressive forces are taken up directly by the centre part of the flange 3.

When a fault arises within the arrester casing, short circuiting arcs are formed which gasify the material in the spark gap and valve resistors so that a high over-pressure arises within the arrester casing. This over-pressure influences the resilient part of the sealing lid outside the centre part supported by the flanges, so that the pressure on the gasket is unloaded and the edge of the lid is bent so that a space occurs between the edge and the insulating casing through which the gas can escape. The hot gas destroys the gasket either by melting or burning it or by blasting it out of position so that the space is rapidly and permanently widened.

It is advantageous to make the resilient peripheral zone of the lid arched or slightly conical. This also means that the lid can be manufactured from thinner sheet material than if the described spring force had been produced with an essentially flat sealing lid. FIGURE 2 shows the deflection characteristic of a sealing lid according to the invention with conical resilient part. From the figure it is clear that the gasket pressure P increases more slowly than proportional to an increasing compression H. The gasket pressure P reaches a maximum at the point A, after which it falls at continued compression of the sealing lid. The sealing lid should preferably be mounted so that the gasket pressure P of the lid is in the level region near the maximum of the curve, thus making the spring pressure uncritically dependent on mechanical tolerances in the armature. With greater compression H the gasket pressure P drops again which ensures a distinct function of the device and contributes to enlarging the outlet openings for the hot gases.

I claim:
1. A lightning arrester having a substantially cylindrical casing of insulating material, end armatures completely or partly made of metal, and having at least at one end of the casing a spring pressure sealing lid, characterized in that the lid is formed as a resilient plate which, at its centre part, abuts against one of the said end armatures and is so arranged that when over-pressure occurs within the lightning arrester casing, the edge of the plate may rise and thus form an outflow channel for gas.

2. Lightning arrester according to claim 1, characterised in that arrester elements placed in the lightning arrester casing are mounted under spring pressure between the end armatures in such a way that the pressure is taken up by the end armatures via the centre parts of the sealing lid abutting against the end armature.

3. Lightning arrester according to claim 1, characterised in that the sealing lid is shaped with a substantially level and circular central part which leads into an outer collar in the form of a low frustrum of a cone.

References Cited in the file of this patent

UNITED STATES PATENTS

| | | |
|---|---|---|
| 1,758,181 | Steinmayer | May 13, 1930 |
| 2,586,285 | Ackermann | Feb. 19, 1952 |
| 2,640,096 | Kalb | May 26, 1953 |